Figure 4:
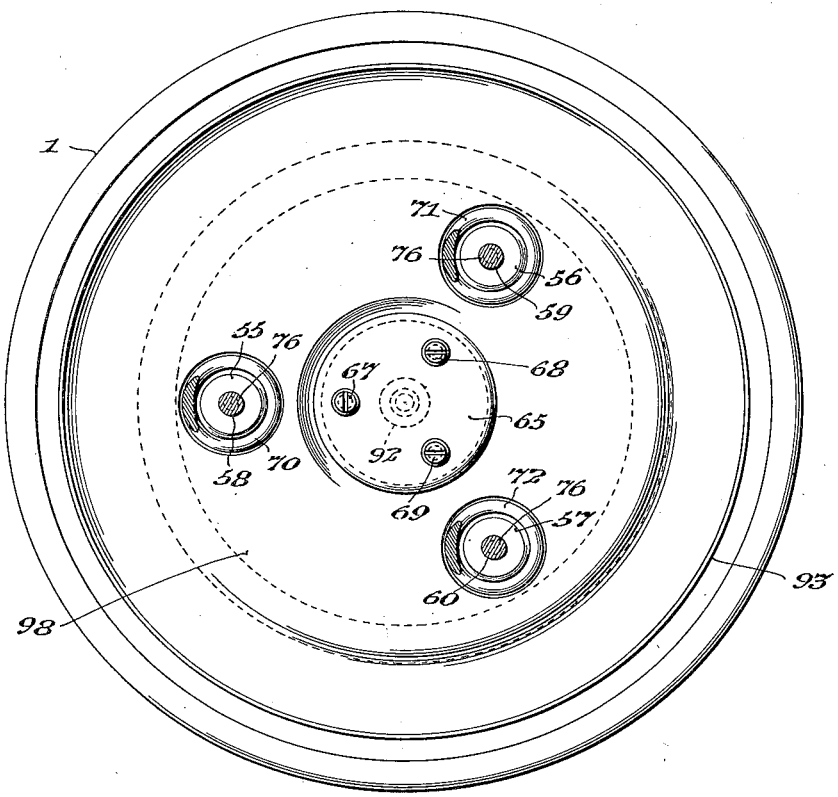

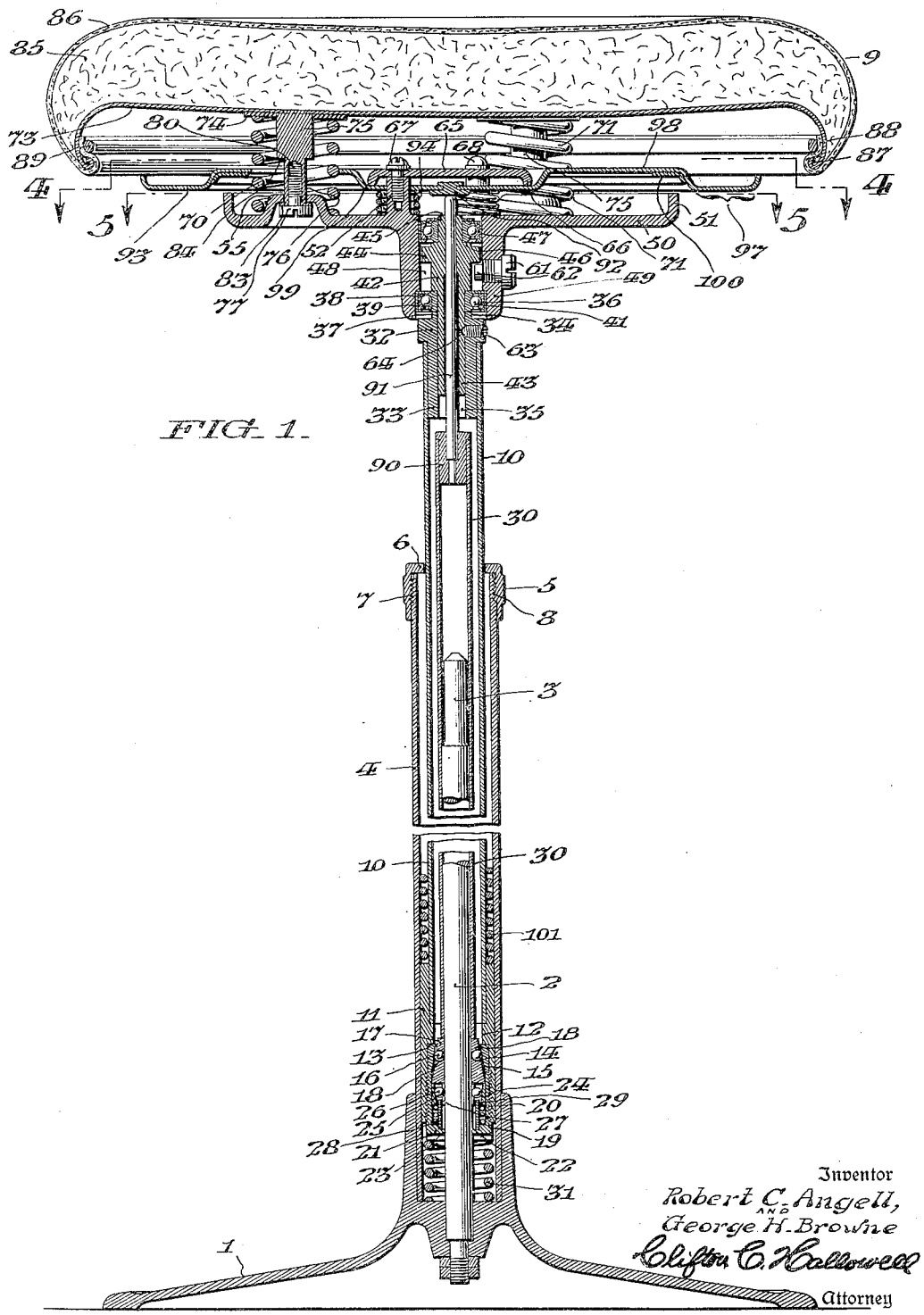

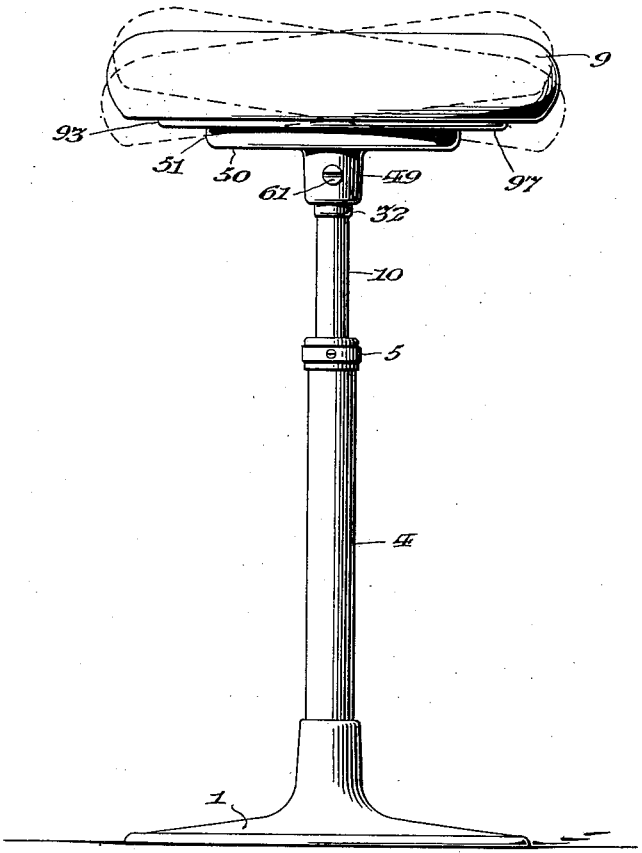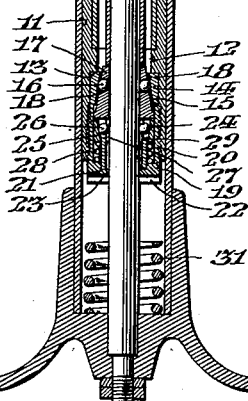

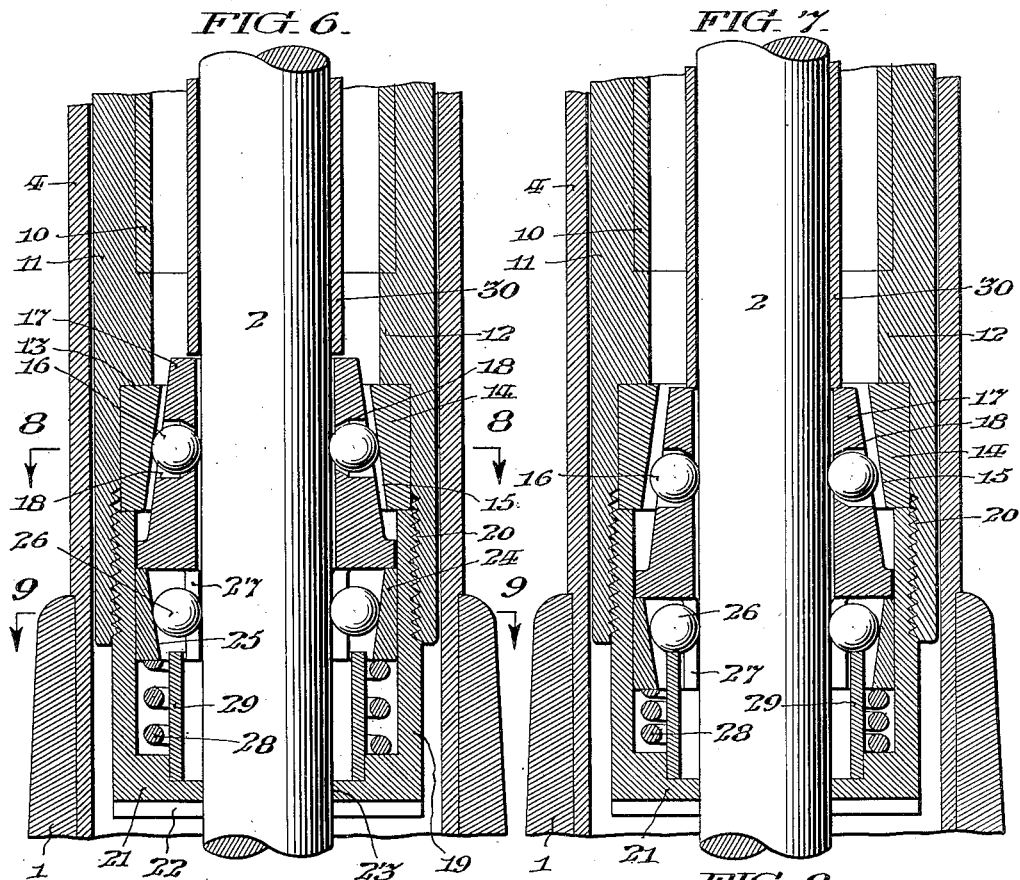
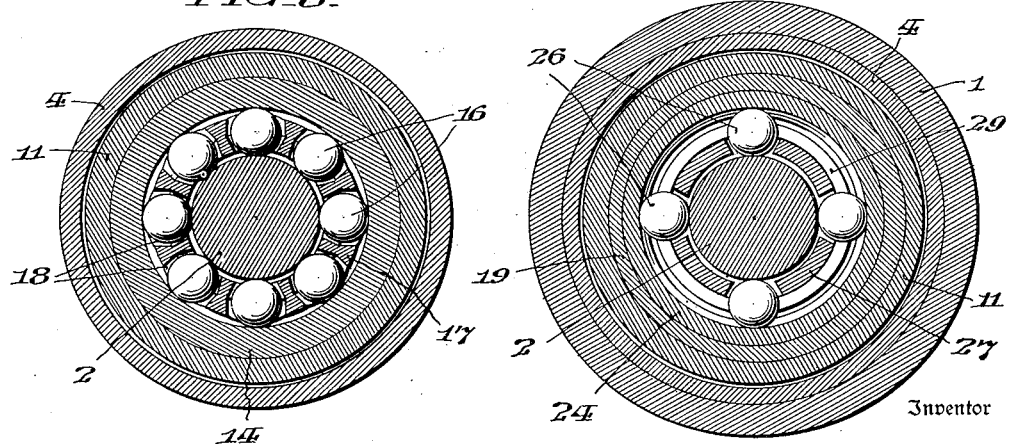

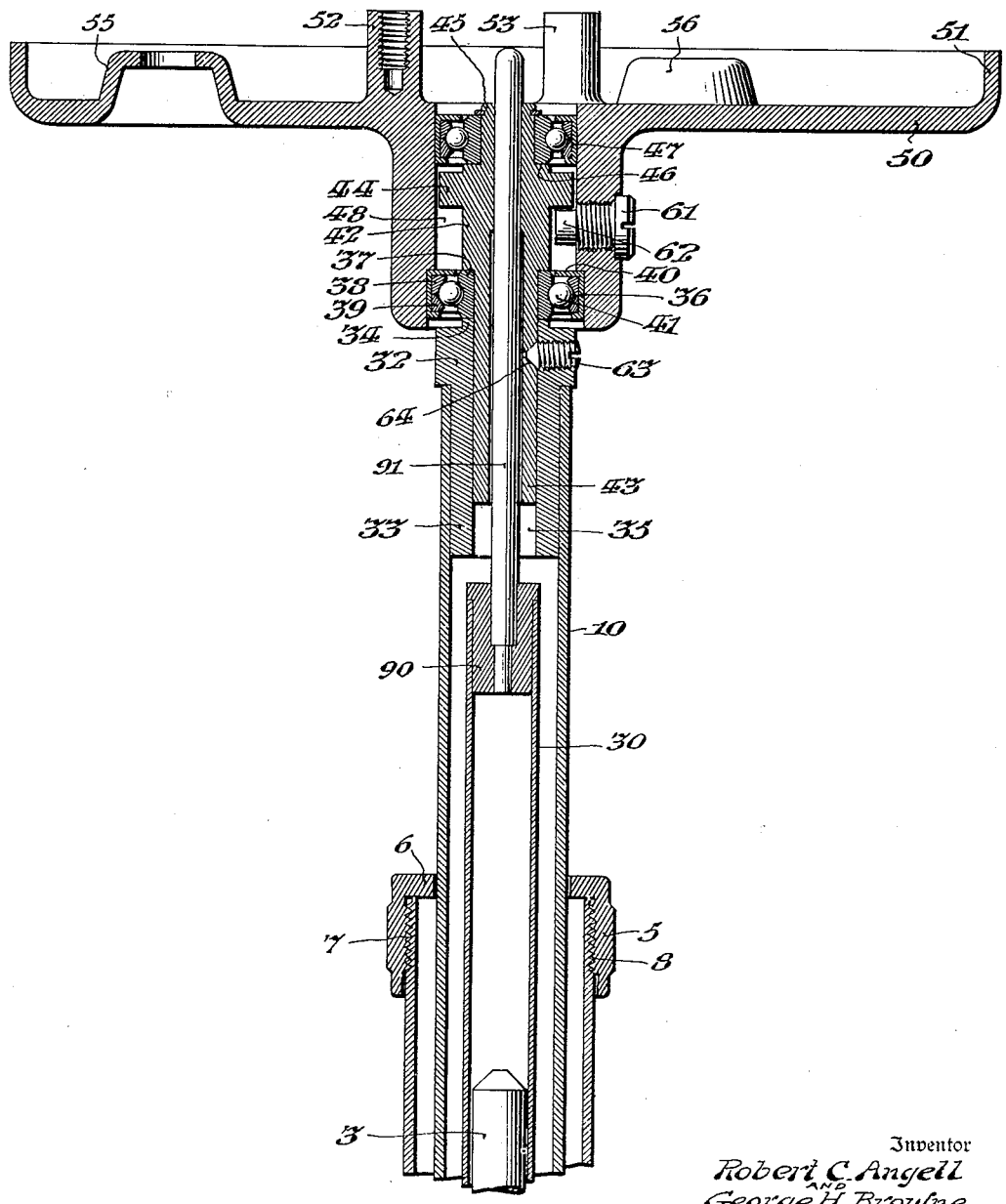

Patented Nov. 14, 1950

2,529,861

UNITED STATES PATENT OFFICE 2,529,861

ADJUSTABLE SEAT SUPPORTING STRUCTURE

Robert C. Angell and George H. Browne, Prince Bay, N. Y., assignors to The S. S. White Dental Manufacturing Company, Philadelphia, Pa., a corporation of Pennsylvania Application September 1, 1945, Serial No. 614,074

11 Claims. (Cl. 155—94)

This invention relates more particularly to that class of seat supporting structures wherein the seat may be readily adjusted to relatively varying vertical positions and wherein said seat may rotate about a vertical axis and be tilted from its normally horizontal position, and while it is especially directed to professional operating stools, it is equally applicable to other types of stools, chairs and seats supports.

The principal objects of my invention are to provide locking mechanism that will not only support the seat in any desired position of vertical adjustment with respect to the base of the seat support, but said base and seat supporting structure may be lifted with the seat when it is desired to move the seat supporting structure including the seat and base to relatively different locations.

Other objects of this invention are to provide relatively separate locking means that respectively operate to independently support the seat and its occupant, and support the base when it is lifted from the floor, but which cooperate to permit the raising or lowering of said seat with respect to its supporting base structure.

Further objects of this invention are to provide lock tripping means disposed in such position as to be capable of convenient operation by the fingers of the operator extended beneath the seat and connected to release the normally active locking means to permit vertical adjustment of said seat with respect to its supporting base structure.

This invention also includes a seat so resiliently mounted for rotation on its supporting structure that it may be tilted to varying angular positions with respect to the axis of said supporting structure throughout the entire range of the circle through which it may rotate.

This invention comprehends an operator's stool having a tiltable seat rotatably mounted on a supporting pedestal and floatingly supported on a circularly arranged series of springs whereby said seat is free to uniformly tilt into various angles to the axis of said supporting structure in the circular series of planes radiating from said axis.

Specifically stated, the form of this invention as hereinafter more definitely described comprises a base having a vertically extended integral guide post or standard embraced by a tubular column which is stationary with said base, and in which the tubular seat supporting column is slidably mounted for vertical adjustment, being provided at its lower end with a fitting in which the locking means are housed for cooperative engagement with said guide post. Said locking means comprising relatively distinct ball bearing units are yieldingly supported and their respective series of balls thereby normally maintained in operative locking contact with their opposing cooperative race surfaces until such time as it is desired to adjust the seat up or down, as may be, when said units may be thrust downwardly in opposition to their yielding support by a sleeve slidably embracing said guide post and terminating upwardly in a plunger-pin having its free upper end disposed closely adjacent to the under side of said seat and arranged to be forced downwardly by a trigger plate yieldingly mounted to rock beneath said seat and to be actuated to release said locking means, by pressure of the operator's fingers which may be extended beneath said seat to effect such rocking movement of said trigger plate.

My invention also includes all of the various novel features of construction and arrangement as hereinafter more definitely specified.

It has heretofore generally been the practice to so construct an operating stool, to pivot the seat post at its base that the seat may be tilted by a swinging or gyrating movement away from the perpendicular, which causes said seat to be shifted out of its normal axial relation to its base, and to provide yielding means arranged to return said seat and its supporting post to said normal position when released, thereby removing it from the abnormal position last occupied by the operator.

The structure herein contemplated provides a seat post which is maintained perpendicular and rotatably supports at its upper end a seat that is arranged to tilt thereon into varying angular positions throughout its radial range and consequently tilts to accommodate the normal operating positions and consequently renders to the operator a feeling of security and comfort while operating.

Figure 5:
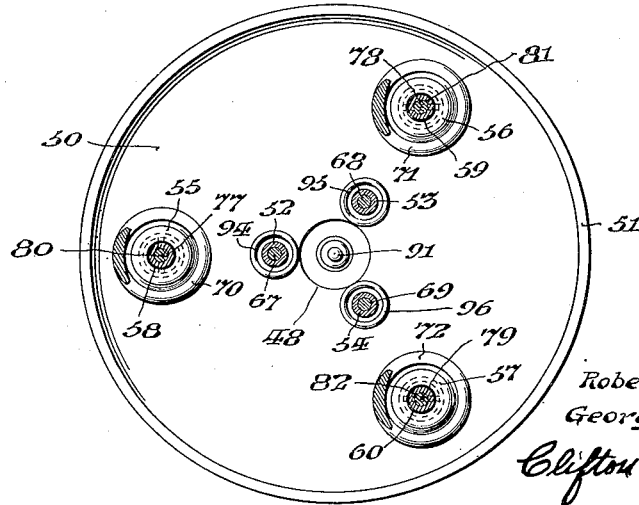

In the accompanying drawings, Figure 1 is a central vertical sectional view of an operator's stool conveniently embodying this invention; Fig. 2 is a side elevational view of the stool shown in Fig. 1, but on a reduced scale; Fig. 3 is a fragmentary vertical sectional view of the lower portion of the stool shown in Fig. 1, but showing the seat post and its locking means raised from its lowermost position as illustrated in said Fig. 1; Fig. 4 is a plan sectional view of said stool taken on the line 4—4 in Fig. 1; Fig. 5 is a plan sectional view of said stool taken on the line 5—5 in Fig. 1, but conveniently omitting the base; Fig. 6 is an enlarged central vertical fragmentary sectional view of the locking mechanism showing the associated parts in their normally locked position; Fig. 7 is an enlarged central vertical fragmentary sectional view of the locking mechanism, similar to Fig. 6, but showing the associated parts in their released position; Fig. 8 is a plan sectional view taken on the line 8—8 in Fig. 6; Fig. 9 is a plan sectional view taken on the line 9—9 in Fig. 6; and Fig. 10 is an enlarged fragmentary central vertical sectional view of the upper portion of the pedestal including the seat mounting frame.

In said figures, the flanged base 1 supports the locking guide stem or standard 2 having an upwardly projecting relatively reduced terminal region 3, and also supports the tubular pedestal 4 which is integral with said base 1 and which is capped by the annular guiding ferrule 5 having the inturned flange 6 and having screw-threaded engagement with the upper end region of said pedestal 4 by the interengaged screw-threads 7 and 8.

The seat 9 is conveniently carried by the tubular seat post 10 which depends for relative vertical adjustment through said guiding ferrule 5 and into the pedestal 4 and is provided at its lower end with the cylindrical housing 11 integrally engaged therewith and arranged to freely slide up and down in the bore of said tubular pedestal 4.

Said cylindrical housing 11 is provided intermediate of its length with an inturned flange 12 which affords an assembly stop for the integrally engaged seat post 20 and provides a convenient shoulder 13 for the ball bearing race ring 14, of the seat supporting lock mechanism, whose inner conoidal upwardly narrowing ball race surface 15 opposes the cylindrical surface of the guide stem 2, and between which the bearing balls 16 are maintained in circularly spaced relation by the ball cage 17 having the ball receiving pockets 18, as best illustrated in Figs. 6 and 8, but also shown in Figs. 1 and 3.

The ball race ring 14 is arranged to be held in position against the shoulder 13 by the cupped cap 19 which is screw-threadedly engaged with the lower end of the housing 11 by the screw-threads 20 and which has its end wall 21 provided with the screw driver slot 22 by which it may be rotated and the central aperture 23 through which the guide stem 2 slidably extends.

Said ball cage 17 rests upon the ball bearing race ring 24 of the base lifting lock mechanism, whose inner conoidal upwardly broadening ball race surface 25 opposes the cylindrical surface of said guide stem 2, and between which the bearing balls 26 are maintained in circularly spaced relation by the ball spacing prongs 27 depending from the ball cage 17, as best illustrated in Figs. 6 and 9, but also shown in Figs. 1 and 3.

The bearing ball race ring 24 and its superposed bearing ball cage 17 are yieldingly supported by the spiral spring 28 which is disposed in the cap 19 and encircles the annular ball stop 29 upon which the bearing balls 26 rest when said spring is compressed, as shown in Fig. 7, by the downward movement of said ball cage 17 and said ball race ring 24 which may be effected by downwardly directed pressure on the bearing ball releasing plunger sleeve 30, see Fig. 7, which slidably embraces the guide stem 2 and whose actuation will be hereinafter described in detail.

Within the hollow of the hub of the base 1 is disposed the short spiral buffer spring 31 which yieldingly absorbs the shock of the adjustable seat supporting mechanism when the locking mechanism just described is released to drop the seat 9 to its lowermost position and tends to yieldingly limit such position of the seat 9 and its supporting seat post 10.

The upper end of the seat post 10 is provided with a tubular fitting 32 which has its reduced extension 33 rigidly engaged within the tubular seat post 10 and which has the upwardly projecting annular flange 34 surrounding its bore 35 and serving to support the lower ball bearing unit 36 which provides for the free rotation of the seat 9 about the vertical axis of the stool support and comprises the inner ball race 37, the outer ball races 38 and 39, their casing 40 and the bearing balls 41.

The fitting 32 carries the tubular spindle 42, whose reduced tail 43 depends into the bore 35 of said fitting 32 and whose relatively adjacent flanges 44 and 45 respectively project radially and axially to provide a seat 46 for the upper ball bearing unit 47 which is similar to the ball bearing unit 36 above described in detail.

The ball bearing units 36 and 47 are encased in the bore 48 of the hollow hub 49 of the circular dished seat mounting frame 50 which, as shown in Fig. 1, has the upturned peripheral flange 51, the circularly arranged posts 52, 53 and 54, and the circularly arranged bosses 55, 56 and 57 respectively having the centrally disposed apertures 58, 59 and 60, as shown in Figs. 4 and 5.

Said seat mounting frame 50 is prevented from accidental displacement from its supporting structure by the set screw 61 which is in screw-threaded engagement with the hub 49 and which has the reduced end extension 62 projecting into the bore 48 of said hub 49 beneath the radially extended flange 44. Said spindle 42 is prevented from accidental displacement from the fitting 32 by the set screw 63 which is in screw-threaded engagement with said fitting 32 with its projecting conical end extended into the conical socket 64 in the reduced tail 43, see Fig. 1.

The posts 52, 53 and 54 conveniently support the fulcrum plate 65, which is provided with the down turned flange 66 and which has apertures through which screws 67, 68 and 69 pass in threaded engagement with threaded sockets in said posts to firmly retain said fulcrum plate 65 thereon, as shown in Figs. 1 and 4.

The bosses 55, 56 and 57 on mounting 50 are encircled by the seat supporting spiral springs 70, 71 and 72 upon which the seat 9 is yieldingly mounted and tiltably adjustable by having its bottom plate 73 resting thereon with the interposed reinforcing washers 74, and from which bottom plate 73 depend the seat guide posts 75 which have their lower end regions 76 relatively reduced and loosely extended through the apertures 58, 59 and 60 in said bosses respectively.

Said seat 9 is retained in position on said springs 70, 71 and 72 by the screws 77, 78 and 79 whose shanks are threadedly engaged in the threaded bores 80, 81 and 82 of the reduced lower regions of the seat guide posts 75 and whose heads, being larger than the apertures 58, 59 and 60, engage the under wall of the respective bosses 55, 56 and 57, with the interposed resilient washers 83, while the shoulders 84 formed on the respective guide posts 75 by their reduced lower regions serve as stops for the downward movement of the seat 9 when the shoulder 84 of each of the respective guide posts 75 engages the upper surface of said bosses to limit tilting of said seat to the broken line positions illustrated in Fig. 2, The seat 9 may be filled with a suitable filling such as hair or other well known filler 85 and may be covered with leather, fabric, or other well known substitute covering material, 86, which may be conveniently drawn peripherally down and around the downwardly curved and incurled peripheral margin 87 of the bottom plate 73 and extended upwardly to afford a peripheral margin 88 of said covering material that may be conveniently engaged by the retaining ring 89.

The seat 9 is normally supported by the locking mechanism, above described, in its lowermost position shown in Fig. 1, and in different uplifted positions, as, for example, as shown in Fig. 3, and in any thus supported vertical position of the seat mounting frame 50, the cooperative parts of the locking mechanism occupy their relative positions indicated in Figs. 1, 3 and 6.

However, when it is desired to adjust the seat 9 and its mounting frame 50, the locking mechanism is rendered inoperative of support by shifting it downwardly to the position illustrated in Fig. 7 wherein the normally expanded uplifting spiral spring 28 is compressed and the bearing balls 16 and 26 are released from binding contact with their opposed cooperative bearing surfaces, thus leaving the seat post 10 free to be adjusted up or down as desired to the position best suited to the operator's convenience.

The downward movement of said locking mechanism and the consequent release of the bearing balls 16 and 26 may be conveniently effected by the downward thrust of the sleeve 30 which closely hugs the guide stem 2 and which is fixedly connected by the fitting 90 with the upwardly extending trigger pin 91 which passes through the bore of the spindle 42 and projects centrally into the hollow of the seat mounting frame 50 with its preferably rounded free end abutted against the button 92 of the circular trigger lever 93.

Said trigger lever 93 is supported upon the three spiral springs 94, 95 and 96 which respectively embrace the posts 52, 53 and 54 and is upheld thereby against the downturned peripheral flange 66 of the fulcrum plate 65 until its peripheral finger tread 97 which is substantially concentric with the under peripheral margin of the seat 9 is engaged by the operator's fingers and so rocked on the flange 66 of the fulcrum plate 65 as to cause the button 92 to force the trigger pin 91 and the sleeve 30 downward whereby to release the locking mechanism as before described.

As shown in Figs. 1 and 4, the trigger lever 93 is in the form of a circular plate having an intermediate upraised annular region 98 which provides an annular seat 99 with which the flange 66 engages, and said plate is provided on its under surface with the annular buffer 100, see Fig. 1, which may be of sound deadening material against which the flange 51 engages when said trigger lever 93 is tipped to effect release of the locking mechanism.

The release of the locking mechanism permits vertical adjustment of the seat post 10 which is limited in its upward movement by the buffer spring 101 which rests upon the housing 11 and which engages the flange 6 at the uppermost limit of movement of said seat post 10.

The stool thus constituted is advantageous in that the seat is compensating, the support being a fixed vertical column affords stability and a feeling of security while sitting, and, the weight of the body being supported by the center of the base, there is no chance of the base skidding.

It is not desired to limit this invention to the precise details of construction and arrangement as herein set forth, as it is obvious that various modifications may be made therein without departing from the essential features of this invention as defined in the appended claims.

Having thus described our invention, we claim:

1. A seat supporting structure provided with a standard affording a leg, a seat post adjustable up and down with respect to said standard, a seat supported by said seat post, locking means arranged to engage said seat post with respect to said standard to prevent downward movement of said seat relative to said standard, separate locking means comprising bearing balls arranged to engage said standard with respect to said seat post to prevent upward movement of said seat post relative to said standard in any vertical position within its range of movement, and means arranged to contemporaneously render both said locking means inoperative.

2. A seat supporting structure provided with a base having a relatively stationary upright tubular column and a standard extended upwardly from said base through said column, a tubular seat supporting post depending into said column and embracing said standard and terminating at its lower region in a housing, a ball race-ring mounted in said housing and having an upwardly narrowing conoidal inner surface, a circular series of bearing balls interposed between said conoidal surface and the cylindrical surface of said standard, a ball cage carrying said balls, a vertically movable ball race-ring supporting said ball cage, and having an upwardly broadening conoidal ball race inner surface, a circular series of bearing balls interposed between said upwardly broadening conoidal surface and the cylindrical surface of said standard, yielding means tending to force said ball race-ring and its supported ball cage upwardly into locking position, and depressing means arranged to release said balls.

3. A seat supporting structure provided with a base having a standard, a seat supporting post embracing said standard and including a housing, a ball race-ring rigidly engaged in said housing and having its inner conoidal surface narrowing upwardly, a ball race-ring slidably mounted in said housing and having its inner conoidal surface narrowing downwardly, separate series of bearing balls respectively disposed between the oppositely inclined conoidal surfaces and the cylindrical surface of said standard, yielding means tending to normally seat said balls, and means arranged to contemporaneously unseat both series of said balls.

4. A seat supporting structure having a standard, a seat carrying post vertically adjustable on said standard and having a housing at its lower end and a fitting at its upper end, a seat mounting frame rotatably carried by said fitting and provided with an extension having a circular fulcrum plate mounted thereon, a trigger lever having a peripheral finger tread yieldingly supported and maintained in rockable contact with said fulcrum plate, means within said housing arranged to lock said seat post in different positions of vertical adjustment and comprising relatively movable ball race-rings having their respective ball race surfaces oppositely inclined, a separate series of bearing balls engaged between said oppositely inclined ball race surfaces and the cylindrical surface of said standard, means comprising a spring tending to yieldingly force all of said balls into operative engagement with said surfaces, and ball releasing means actuated by said trigger lever arranged to contemporaneously release said balls from their operative engagement with said surfaces.

5. A seat supporting structure having a standard, a seat carrying post vertically adjustable on said standard and having a housing at its lower end and a fitting at its upper end, a seat mounting frame rotatably carried by said fitting and provided with a circular fulcrum plate mounted thereon, a trigger lever having a peripheral finger tread and a dished central region yieldingly supported and maintained in rockable contact with said fulcrum plate, means within said housing arranged to lock said seat post in different positions of vertical adjustment and comprising relatively movable ball race-rings having their respective ball race surfaces oppositely inclined, a ball cage supported on one of said rings and carrying the balls which cooperate with said other ring, a ball stop for the last mentioned balls, a cap for said housing upon which said ball rest is supported, a spring in said cap tending to force said balls into operative engagement with their respective cooperative surfaces, and ball releasing means actuated by said trigger lever arranged to release said balls from their operative engagement with said surfaces.

6. A seat supporting structure comprising a pedestal extending upwardly from said base and including a standard, a cap on said pedestal having a flange, a seat post depending into said pedestal, being vertically adjustable with respect to said standard, and having dual locking means independently preventing relative movement of said post and standard respectively up and down, yielding means tending to effect locking action of said locking means, a seat mounting frame rotatably carried by said post and supporting a substantially circular fulcrum plate, a suitably mounted substantially circular trigger lever having a peripheral finger tread extending into closely adjacent concentric relation to the peripheral region of the seat and arranged to be manually tilted on any part of the periphery of said fulcrum plate, an actuator extending between said locking means and said trigger lever whereby the tilting of said trigger lever effects axial movement of said connector to force said locking means out of operative locking action, and yielding means cooperative with said flange to limit the upward movement of said post and the seat mounting frame thereby supported.

7. A seat supporting structure comprising a base having a pedestal and including a standard, a cap on said pedestal having a flange, a seat post depending into said pedestal, being vertically adjustable with respect to said standard, and terminating oppositely in a housing and in a fitting, relatively movable ball race-rings mounted in said housing and respectively having oppositely inclined race surfaces, a circular series of bearing balls for each race-ring cooperatively engaged between said inclined race surfaces and the cylindrical surface of said standard, a ball cage for said balls movable with one of said race-rings and with respect to the other race-ring, a cap on said housing, a spring in said cap yieldingly forcing said last mentioned race-ring and cage into position to effect locking engagement of said balls and their cooperative race surfaces, ball bearings carried by said fitting, a seat mounting frame rotatably carried by said ball bearings and having a circular fulcrum plate mounted thereon, a circular trigger lever yieldingly supported and maintained in pivotal operative cooperation with the periphery of said fulcrum plate and arranged to be tilted by manual pressure applied at any part of its peripheral margin to effect vertical displacement of its central region, and a plunger engaging the central region of said trigger lever and said ball cage whereby the manually effected tilting of said lever effects downward movement of said cage and its supporting race-ring to release said bearing balls from their locking engagement with the ball race surfaces and thereby permitting free axial adjustment of said seat post while said trigger is maintained tilted.

8. A seat supporting structure comprising a base having a pedestal and including a standard, a cap on said pedestal having a flange, a seat post depending into said pedestal, being vertically adjustable with respect to said standard, and terminating oppositely in a housing and in a fitting, relatively movable ball race-rings mounted in said housing and respectively having oppositely inclined race surfaces, a circular series of bearing balls for each race-ring cooperatively engaged between said inclined race surfaces and the cylindrical surface of said standard, a ball cage for said balls movable with one of said race-rings and with respect to the other race-ring, a cap on said housing, a spring in said cap yieldingly forcing said last mentioned race-ring and cage into position to effect locking engagement of said balls and their cooperative race surfaces, ball bearings carried by said fitting, a seat mounting frame rotatably carried by said ball bearings and having a circular fulcrum plate carried thereby, a circular trigger lever yieldingly maintained in pivotal operative cooperation with the periphery of said fulcrum plate and arranged to be tilted by manual pressure applied at any part of its peripheral margin to effect displacement of its central region, a plunger engaging the central region of said trigger lever and said ball cage whereby the manually effected tilting of said lever effects downward movement of said cage and its supporting race-ring to release said bearing balls from their locking engagement with the ball race surfaces and thereby permitting free axial adjustment of said seat post while said trigger is maintained tilted, a buffer spring interposed between said base and said seat post, and a buffer spring interposed between said housing and said flange.

9. A seat supporting structure comprising a base having a pedestal and including a standard, a cap on said pedestal having a flange, a seat post depending into said pedestal, being vertically adjustable with respect to said standard, and terminating oppositely in a housing and in a fitting, relatively movable ball race-rings mounted in said housing and respectively having oppositely inclined race surfaces, a circular series of bearing balls for each race-ring cooperatively engaged between said inclined race surfaces and the cylindrical surface of said standard, a ball cage for said balls movable with one of said race-rings and with respect to the other race-ring, a cap on said housing, a spring in said cap yieldingly forcing said last mentioned race-ring and cage into position to effect locking engagement of said balls and their cooperative race surfaces, ball bearings carried by said fitting, a seat mounting frame rotatably carried by said ball bearings and having a circular fulcrum plate secured thereto, a circular trigger lever yieldingly maintained in operative cooperation with the periphery of said fulcrum plate and arranged to be tilted by manual pressure applied at any part of its peripheral margin to effect displacement of its central region, a plunger engaging the central region of said trigger lever and said ball cage whereby the manually effected tilting of said lever effects downward movement of said cage and its supporting race-ring to release said bearing balls from their locking engagement with the ball race surfaces and thereby permitting free axial adjustment of said seat post while said trigger is maintained tilted, a series of circularly arranged springs carried by said seat mounting frame, and a seat supported on said last mentioned springs whereby it may be tilted from its normal horizontal position.

10. A seat supporting structure having a standard, a seat supporting post vertically adjustable on said standard and having a housing, ball race-rings mounted in said housing and having oppositely inclined conoidal inner surfaces movable one with respect to the other, a separate series of bearing balls interposed between the respective conoidal surfaces and the cylindrical surface of said standard, yielding means tending to normally uplift the movable race-rings and thereby effect seating of said balls, and means operable from the supported seat arranged to compress said yielding means and thereby disengage all of said balls from said surfaces to permit free vertical movement of said seat.

11. A seat supporting structure comprising a base, a pedestal extending upwardly from said base and including a standard, a seat carrying post vertically adjustable with respect to said standard and having a housing at its lower end and a fitting at its upper end, a seat mounting frame rotatably carried by said fitting, a circular fulcrum plate removably secured to said frame, a trigger lever operable from beneath said seat and yieldingly supported and maintained in rockable contact with said fulcrum plate, a circularly arranged series of springs carried by said frame upon which the seat is tiltably mounted, locking means in said housing comprising relatively movable ball race rings having relatively inclined ball race surfaces, and opposed to the cylindrical surface of said standard, a spring in said housing tending to shift said balls into operative contact with the opposed inclined surfaces of said race rings and cylindrical surface of said standard, and means engaged between said locking means and the trigger lever whereby the rocking of said trigger lever effects release of said balls from said surfaces.

ROBERT C. ANGELL.
GEORGE H. BROWNE.

REFERENCES CITED

The following references are of record in the file of this patent:

UNITED STATES PATENTS

| Number | Name | Date |
|---|---|---|
| 186,570 | Huffman | Jan. 23, 1877 |
| 478,840 | Biggs | July 12, 1892 |
| 507,044 | Schmidt | Oct. 17, 1893 |
| 569,809 | Burke | Oct. 20, 1896 |
| 720,549 | Adler | Feb. 17, 1903 |
| 811,278 | Coy | Jan. 30, 1906 |
| 909,223 | Reynolds | Jan. 12, 1909 |
| 965,113 | Konstantinides | July 19, 1910 |
| 1,058,655 | Bates | Apr. 8, 1913 |
| 1,194,551 | Schossler | Aug. 15, 1916 |
| 1,610,730 | Baler | Dec. 14, 1926 |
| 1,911,636 | Meitzler | May 30, 1933 |
| 2,010,290 | Campbell | Aug. 6, 1935 |
| 2,218,963 | Stephenson | Oct. 22, 1940 |
| 2,341,465 | Monnot | Feb. 8, 1944 |